G. R. DE NISE.
TEMPORARY TOOTH.
APPLICATION FILED JUNE 10, 1922.
1,436,016. Patented Nov. 21, 1922.
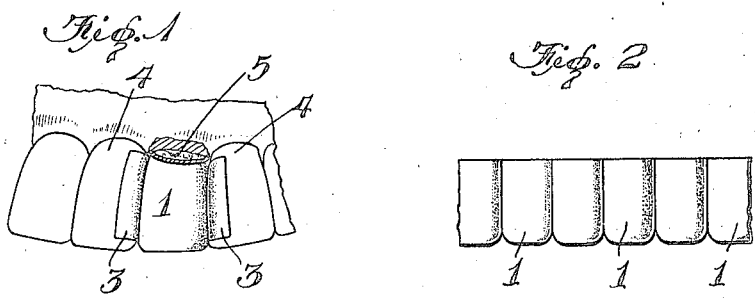
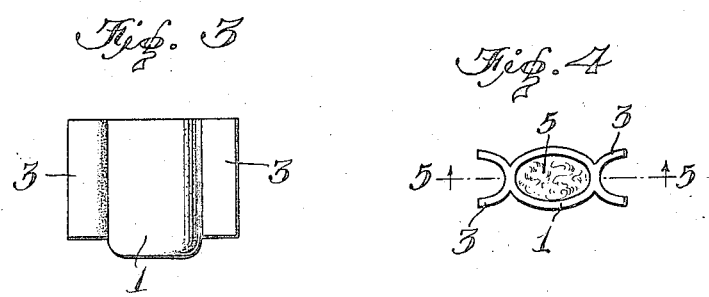
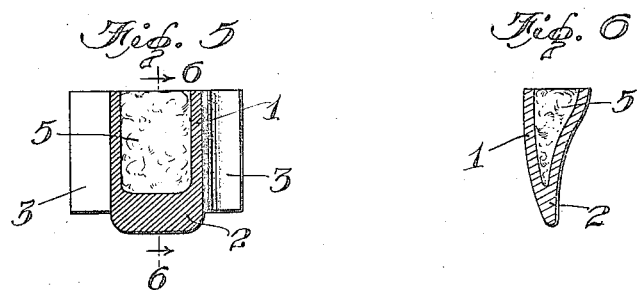
Inventor
George R. DeNise
By E. H. Bond
Attorney Patented Nov. 21, 1922.

1,436,016

UNITED STATES PATENT OFFICE.

GEORGE R. DE NISE, OF ROCHESTER, MINNESOTA.

TEMPORARY TOOTH.

Application filed June 10, 1922. Serial No. 567,410.

*To all whom it may concern:*

Be it known that I, GEORGE R. DE NISE, a citizen of the United States, residing at Rochester, in the county of Olmsted and State of Minnesota, have invented certain new and useful Improvements in Temporary Teeth, of which the following is a specification.

This invention pertains to the art of dentistry and it has for its objects among others to provide for the temporary closure of the space and opening left by the extraction of a tooth or teeth so as to present a comely appearance that may be retained until the artificial tooth or teeth are made and ready for use, or for as long a time as may be desired.

It has for a further object to provide a hollow tooth, flexible, so that the biting thereon will neither break it away nor cause it to press against the sore socket from which the tooth has been drawn. It is made hollow in order that it may be filled with medicated cotton or other material which will be healing, and which will serve to prevent infection.

I may sometimes make the teeth in series from which the dentist may cut one or more teeth as he may have occasion, the teeth being made of different sizes and form for an obvious purpose. The hollow flexible teeth may be affixed in place in a variety of ways, some of which will be hereinafter more particularly set forth.

Other objects and advantages of the invention will hereinafter appear and the novel features thereof will be particularly pointed out in the appended claims.

The invention is clearly illustrated in the accompanying drawing, which, with the numerals of reference marked thereof, form a part of this specification, and in which Figure 1 is a front elevation showing one of the flexible hollow teeth in position.

Figure 2 is an elevation showing a multiplicity of the teeth as supplied to the trade.

Figure 3 is a front elevation on an enlarged scale of one of the teeth ready for application.

Figure 4 is a top plan of Figure 3.

Figure 5 is a section on the line 5—5 of Figure 4.

Figure 6 is a section on the line 6—6 of Figure 5.

Like numerals of reference indicate like parts throughout the several views.

In carrying out my invention, I may make a single tooth, two teeth, or a greater number, as, for instance, a whole plate of temporary teeth of this design to be used immediately after the extractions, with a course of medicated cotton between the teeth and the gums.

I may construct the single tooth, or the series of teeth, of fabric, or of rubber or analogous flexible material, in the form of a hollow cup 1 preferably with increased thickness, as seen at 2, for biting purposes, the tooth or cup being of such form as to conform to the different type of teeth whose place they are to fill.

The teeth may be retained in position in any suitable manner. One convenient means of accomplishing this purpose is to provide the tooth with a series of wings 3 which extend beyond opposite sides thereof which may be readily cemented to adjoining teeth 4, as seen in Figure 1. The wings may be of any desired dimensions, of sufficient extent, if desired, to cover the adjoining teeth, and the whole front can then be enameled.

When made in series, the desired tooth or number of teeth may be readily cut from the series, leaving a tooth in the middle and wings on the side. If made of rubber, the teeth may have a fabric covering the same and the fabric used for cementing the adjoining teeth.

When a tooth is extracted, one of my hollow teeth is filled with medicated cotton or the like 5, the natural teeth then dried and the new tooth inserted in the socket from which a tooth has been extracted, and then cemented in place.

From the foregoing, it will be seen that I have devised a simple and cheap way of temporarily filling the space or spaces left by the extraction of a tooth or teeth, and while the foregoing illustration is what I, at the present time, consider an efficient method and means for accomplishing the end in view, it will be evident that the same is subject to changes, variations, and modifications in detail, proportion of parts, etc., and that other means may be employed for securing the hollow temporary teeth in position without departing from the spirit of the invention or sacrificing any of its advantages. I, therefore, do not restrict myself to the particular construction and method of affixing the teeth in place, but reserve the right to make such changes, variations and modifications as come properly within the scope of the appended claims.

What is claimed as new is:—

1. The method of temporarily filling a socket from which a tooth has been extracted, which consists in applying to said socket a hollow flexible member and then affixing it in position.

2. The method of temporarily filling a socket from which a tooth has been extracted, which consists in placing a medicant within a hollow flexible tooth and then applying such tooth to such socket and affixing the tooth in place.

3. The method of temporarily filling a socket from which a tooth has been extracted, which consists in placing a medicant within a hollow flexible tooth and then applying such tooth to such socket and affixing the tooth in place by cementing to the adjoining teeth.

4. As an improved article of manufacture, a hollow flexible tooth.

5. As a new article of manufacture, a hollow tooth having means for its attachment to adjoining teeth.

6. As a new article of manufacture, a hollow flexible tooth having pliable wings for its attachment to adjoining teeth.

7. A series of connected flexible hollow teeth having means for affixing the same in position between adjacent teeth over a cavity formed by extraction.

8. A series of connected flexible hollow teeth with pliable means for attachment and separable for use.

In testimony whereof I affix my signature.

GEORGE R. DE NISE.